(12) United States Patent
Martinez et al.

(10) Patent No.: US 8,185,738 B2
(45) Date of Patent: May 22, 2012

(54) DATA TRANSMISSION METHOD USING AN ACKNOWLEDGEMENT CODE COMPRISING HIDDEN AUTHENTICATION BITS

(75) Inventors: Albert Martinez, Bouc Bel Air (FR); William Orlando, Peynier (FR)

(73) Assignee: STMicroelectronics SA, Montrouge (FR)

( * ) Notice: Subject to any disclaimer, the term of this patent is extended or adjusted under 35 U.S.C. 154(b) by 948 days.

(21) Appl. No.: 11/874,806

(22) Filed: Oct. 18, 2007

(65) Prior Publication Data

US 2008/0098231 A1 Apr. 24, 2008

(30) Foreign Application Priority Data

Oct. 19, 2006 (FR) .................................... 06 09169

(51) Int. Cl.
*H04L 29/06* (2006.01)
(52) U.S. Cl. .......................... 713/168; 713/181
(58) Field of Classification Search .................. None
See application file for complete search history.

(56) References Cited

U.S. PATENT DOCUMENTS

| | | | | |
|---|---|---|---|---|
| 4,933,969 A * | 6/1990 | Marshall et al. | ............... | 713/177 |
| 6,094,722 A * | 7/2000 | Astola et al. | ................. | 713/176 |
| 7,383,432 B1 * | 6/2008 | Barnes et al. | ................. | 713/151 |
| 7,401,217 B2 * | 7/2008 | Huang et al. | ................. | 713/153 |
| 2002/0044552 A1 | 4/2002 | Vialen et al. | | |
| 2002/0110239 A1 * | 8/2002 | Venkatesan et al. | ........... | 380/28 |
| 2002/0174332 A1 | 11/2002 | Vialen et al. | | |
| 2004/0003246 A1 * | 1/2004 | Hopkins et al. | ............... | 713/168 |
| 2004/0193876 A1 * | 9/2004 | Donley et al. | ................. | 713/162 |
| 2005/0033960 A1 | 2/2005 | Vialen et al. | | |
| 2005/0097361 A1 * | 5/2005 | Apostolopoulos et al. | ... | 713/201 |
| 2005/0179568 A1 * | 8/2005 | Wee et al. | ......................... | 341/50 |
| 2006/0149676 A1 * | 7/2006 | Sprunk et al. | ................... | 705/50 |
| 2008/0228650 A1 * | 9/2008 | Cochran et al. | ................. | 705/59 |
| 2008/0229099 A1 * | 9/2008 | Kim et al. | ........................ | 713/160 |
| 2010/0150395 A1 * | 6/2010 | Davis et al. | .................... | 382/100 |

FOREIGN PATENT DOCUMENTS

GB  2 315 965 A  2/1998

* cited by examiner

*Primary Examiner* — Nathan Flynn
*Assistant Examiner* — Michael R Vaughan
(74) *Attorney, Agent, or Firm* — Seed IP Law Group PLLC

(57) ABSTRACT

A method for transmitting data between a first and a second point comprises the steps of transmitting data, from the first to the second point, together with a signature comprising bits of a first authentication code, and transmitting an acknowledgement, from the second to the first point. The length of the first authentication code is greater than the length of the signature and the first authentication code comprises hidden authentication bits. The acknowledgement is produced by using hidden authentication bits of a second authentication code presumed to be identical to the first, produced at the second point.

33 Claims, 4 Drawing Sheets

DATA TRANSMISSION METHOD USING AN ACKNOWLEDGEMENT CODE COMPRISING HIDDEN AUTHENTICATION BITS

BACKGROUND

1. Technical Field

The present invention relates to the field of secured data transmissions and more particularly to the securization of acknowledgements sent by a secured device in response to a message sent by another secured device.

The present invention particularly relates, but not exclusively, to the securization of a data transmission between an electrically erasable and programmable memory, for example an EEPROM or FLASH memory, and a device using the memory to store data.

2. Description of the Related Art

Various electronic equipment, such as printers, mobile telephones, PDA (Personal digital assistants) are capable of being equipped with a secured electrically erasable and programmable memory, to therein store sensitive data such as the serial number of the equipment, the version number of the operating system (OS) of the equipment, the references of the technical units ("technical platform") with which the equipment is equipped, etc.

The present invention aims to perfect a classic technique of secured data transmission which will be briefly described in relation with FIGS. 1 and 2. FIG. 1 very schematically represents a secured memory M1 and a device D1 linked to the memory M1 by any data link, for example a wire link. FIG. 2 is a flowchart relating to steps described below.

The memory M1 and the device D1 are generally integrated circuits on a semiconductor chip and each have a random word generator RGEN and a cryptographic function FKs with a secrete key Ks. The sequence of a communication, or session, between the device D1 and the memory M1 comprises an authentication phase, a phase of determining a session key, and a phase of conducting the session in which the device D1 and the memory M1 exchange data.

The authentication phase, preferably a mutual authentication, is similar to that occurring for example between a smart card and a smart card reader. It thus comprises a phase of the device D1 authenticating the memory M1 and a phase of the memory M1 authenticating the device D1.

To authenticate the memory M1, the device D1 generates a random word RD1 and then sends it to the memory M1. The memory M1 receives the random word RD1, transforms it by means of its cryptographic function, then sends the result FKs(RD1) to the device D1. The device D1 receives the result FKs(RD1), itself produces a result FKs(RD1)' by means of its own cryptographic function, then compares the two results so as to make sure that the memory M1 holds the secrete key Ks.

The authentication of the device D1 by the memory M1 is similar to the authentication of the memory by the device, but the "roles" are reversed. The authentication of the device D1 thus involves a second random word RD2 which is generated by the memory M1.

Once these steps are completed, the device D1 and the memory M1 together define a session key SK. This session key is for example defined using the random words RD1, RD2 and according to a common determination rule, such as a deterministic key generation function for example. The device D1 and the memory M1 can also use a secret key table and each choose the same session key in their respective tables, according to a determined selection rule, for example depending on the value of the random words RD1, RD2.

The session comprises the device D1 sending messages and the memory M1 sending acknowledgements. The messages are for example commands for writing, reading or erasing the memory, commands for opening or closing sessions, etc. These messages can therefore comprise a write or read address and data to be written. The session is secured in a manner enabling data hacking to be countered, the most well-known attack being the so-called "man in the middle" attack. According to this attack scenario, a hacker intercepts and falsifies the exchanges so as to pass himself off as the device D1 or the memory M1.

Thus, the exchange of data is secured by associating to each message or each acknowledgement a signature which authenticates the message or acknowledgement, as described by the flow chart in FIG. 2.

It is assumed here that the device D1 must send a message MESS to the memory M1. The device D1 uses its cryptographic function to produce a signature S1 (step S10) of the type:

$S1=FKs(MESS,SK)$, which is obtained by applying the message MESS and a secret or temporary parameter like the session key SK to the input of the cryptographic function. The message MESS is then sent to the memory M1 together with the signature S1 (step S11).

The memory receives the message MESS (step S20) and produces, by means of its own cryptographic function, an internal signature S1' (step S21) of the type:

$S1'=FKs(MESS,SK)$, which is therefore, in principle, identical to the signature S1.

The memory then compares the signatures S1 and S1' (step S22) to authenticate the message received. If the two signatures are identical, the memory executes the command contained in the message (step not represented) and then prepares to send an acknowledgement ACK to attest to the proper receipt of the message and its proper execution (when the message is a write command for example; in the case of a read command the response will consist in sending the data read together with a signature).

For this purpose, the memory M1 again uses its cryptographic function to produce a signature S2 (step S23) from the acknowledgement ACK and the session key SK, the signature S2 thus being of the type:

$S2=FKs(ACK,SK)$.

The acknowledgement ACK is then sent to the device D1 together with the signature S2 (step S24).

The device D1 receives the acknowledgement ACK and the signature S2 (step S12) and again uses its cryptographic function to produce an internal signature S2' (step S13) of the type:

$S2'=FKs(ACK,SK)$, which is therefore, in principle, identical to the signature S2.

The device D1 then compares the signatures S2 and S2' to authenticate the acknowledgement received (step S14). If the two signatures are identical, the message MESS is considered to be received and, according to the nature of the message, to be executed (write message for example).

This classic method, although it is effective to counter hacking, proves to be inconvenient as it requires two steps of cryptographic calculation to be conducted in the device D1 and two steps of cryptographic calculation in the memory M1. More precisely, each device D1, M1 performs a cryptographic calculation upon each transmission of a message and a cryptographic calculation upon each transmission of an acknowledgement. As the cryptographic calculations are not instantaneous and require a considerable number of clock cycles to be applied to the circuit executing the cryptographic function, they slow down the exchange of data. This is particularly the case when encryption circuits that are "optimized" in terms of occupied silicon surface and/or in terms of cost price are used. Such circuits have performances that are voluntarily limited, sometimes even degraded, to meet encumbrance and/or cost requirements. The number of clock cycles they need to produce a cryptographic code can be substantially increased compared to performance-optimized circuits. In this case, it is particularly desirable to reduce the number of cryptographic calculations.

BRIEF SUMMARY

One embodiment is a method for securing a data transmission which is robust in terms of security but which uses fewer cryptographic calculations.

The method uses a single cryptographic code to sign a message and to form the corresponding acknowledgement. For this purpose, the length of the cryptographic code is provided greater than that of the signature. As a result, not all of the bits of the cryptographic code are used to sign the message. The unused bits form hidden bits and are used to form the acknowledgement of the message.

One embodiment provides a method for sending data, comprising steps of producing, from data to be sent, an authentication code comprising authentication bits, sending the data and a signature comprising authentication bits of the authentication code, receiving an acknowledgement, and checking the authenticity of the acknowledgement, wherein the length of the authentication code is greater than the length of the signature, the authentication code comprising hidden bits which are not inserted into the signature, and the authenticity of the acknowledgement is determined by checking that hidden authentication bits are in the acknowledgement.

According to one embodiment, the authenticity of the acknowledgement is determined by checking that all the hidden bits are in the acknowledgement.

According to one embodiment, the authenticity of the acknowledgement is determined by checking that hidden bits are in the acknowledgement in an order corresponding to their initial order in the authentication code or in a reverse order compared to their initial order.

According to one embodiment, the authenticity of the acknowledgement is determined by checking that all or part of the hidden bits are in the acknowledgement in an interlaced order determined by an interlacing function, compared to their initial order in the authentication code.

According to one embodiment, the authenticity of the acknowledgement is determined by also checking that authentication bits present in the signature are in the acknowledgement.

According to one embodiment, the authentication code is produced from the data to be sent and at least one secret session key.

According to one embodiment, the method comprises the steps of producing an internal acknowledgement by using the hidden authentication bits of the authentication code, and determining the authenticity of the acknowledgement received by comparing it with the internal acknowledgement.

One embodiment is a method for receiving data, comprising steps of receiving data and a signature comprising authentication bits, producing, from the data received, an authentication code comprising authentication bits, and producing and sending an acknowledgement, wherein the length of the authentication code is greater than the length of the signature, the authentication code comprising hidden authentication bits which are not present in the signature, and the acknowledgement is produced without producing any new authentication code, by using the hidden authentication bits of the authentication code.

According to one embodiment, all the hidden bits of the authentication code are inserted into the acknowledgement.

According to one embodiment, all or part of the hidden bits of the authentication code are inserted into the acknowledgement, in an order corresponding to their initial order in the authentication code or in a reverse order compared to their initial order.

According to one embodiment, all or part of the hidden bits are inserted into the acknowledgement in an interlaced order determined by an interlacing function, compared to their initial order in the authentication code.

According to one embodiment, a portion of the authentication bits present in the signature is also inserted into the acknowledgement.

According to one embodiment, the authentication code is produced from the data received and at least one secret session key.

According to one embodiment, the method comprises a step of checking the authenticity of the signature received by using the authentication code.

One embodiment is a method for transmitting data between a point A and a point B, comprising the steps of producing at point A, from data to be transmitted, a first authentication code comprising authentication bits, transmitting, from point A to point B, the data and a signature comprising authentication bits of the authentication code, producing at point B, from the data received, a second authentication code presumed to be identical to the first one, producing at point B an acknowledgement, transmitting the acknowledgement from point B to point A, and checking at point A the authenticity of the acknowledgement received, wherein the length of the first authentication code is greater than the length of the signature, the first authentication code comprising hidden authentication bits which are not inserted into the signature, the second authentication code also comprises hidden bits assumed to be identical to the hidden bits of the first authentication code, the acknowledgement is produced by using hidden authentication bits of the second authentication code, and the authenticity of the acknowledgement is determined at point A by checking that hidden authentication bits of the first authentication code are in the acknowledgement.

According to one embodiment, all the hidden bits of the second authentication code are inserted into the acknowledgement, and the authenticity of the acknowledgement is determined at point A by checking that all the hidden bits of the first authentication code are in the acknowledgement.

According to one embodiment, all or part of the hidden bits of the second authentication code are inserted into the acknowledgement, in an order corresponding to their initial order in the second authentication code or in a reverse order compared to their initial order, and the authenticity of the acknowledgement is determined at point A by checking that hidden bits of the first authentication code are in the acknowledgement in an order corresponding to their initial order in the first authentication code or in a reverse order compared to their initial order.

According to one embodiment, all or part of the hidden bits of the second authentication code are inserted into the acknowledgement in an interlaced order determined by an interlacing function, compared to their initial order in the second authentication code, and the authenticity of the acknowledgement is determined at point A by checking that all or part of the hidden bits of the first authentication code are in the acknowledgement in an interlaced order determined by said interlacing function, compared to their initial order in the first authentication code.

According to one embodiment, a portion of the authentication bits present in the signature is also inserted into the acknowledgement, and the authenticity of the acknowledgement is determined by also checking that the authentication bits of the signature are in the acknowledgement.

According to one embodiment, the first authentication code is produced from the data to be transmitted and at least one secret session key known at point A and known at point B.

According to one embodiment, the method comprises a step of checking the authenticity of the signature received at point B by using the second authentication code.

According to one embodiment, the method comprises the steps of producing at point A an internal acknowledgement by using the hidden authentication bits of the first authentication code, and determining at point A the authenticity of the acknowledgement received by comparing it with the internal acknowledgement.

One embodiment is a device for sending data comprising data processing and communication means for producing, from data to be sent, an authentication code comprising authentication bits, sending the data and a signature comprising authentication bits of the authentication code, receiving an acknowledgement of data receipt, and checking the authenticity of the acknowledgement, wherein the data processing means are arranged for producing the authentication code so that the length of the authentication code is greater than the length of the signature, and only inserting a portion of the authentication bits into the signature, the other bits of the authentication code forming hidden bits, and determining the authenticity of the acknowledgement by checking that hidden authentication bits are in the acknowledgement.

According to one embodiment, the data processing means are arranged for checking that all the hidden bits are in the acknowledgement.

According to one embodiment, the data processing means are arranged for checking that hidden bits are in the acknowledgement in an order corresponding to their initial order in the authentication code or in a reverse order compared to their initial order.

According to one embodiment, the data processing means are arranged for checking that all or part of the hidden bits are in the acknowledgement in an interlaced order determined by an interlacing function, compared to their initial order in the authentication code.

According to one embodiment, the data processing means are arranged for also checking that authentication bits present in the signature are in the acknowledgement.

According to one embodiment, the data processing means are arranged for producing the authentication code from the data to be sent and at least one secret session key.

According to one embodiment, the data processing means are arranged for producing an internal acknowledgement by using the hidden authentication bits of the first authentication code, and determining the authenticity of the acknowledgement received by comparing it with the internal acknowledgement.

One embodiment is a device for receiving data comprising data processing and communication means for receiving data and a signature comprising authentication bits, producing, from the data received, an authentication code comprising authentication bits, and producing and sending an acknowledgement, wherein the data processing means are arranged for producing the authentication code so that the authentication code is of a length greater than the length of the signature and includes hidden authentication bits which are not present in the signature, and producing the acknowledgement without producing any new authentication code, by using the hidden authentication bits of the authentication code.

According to one embodiment, the data processing means are arranged for inserting into the acknowledgement all the hidden bits of the authentication code.

According to one embodiment, the data processing means are arranged for inserting all or part of the hidden bits of the authentication code into the acknowledgement, in an order corresponding to their initial order in the authentication code or in a reverse order compared to their initial order.

According to one embodiment, the data processing means are arranged for inserting all or part of the hidden bits into the acknowledgement, in an interlaced order determined by an interlacing function compared to their initial order in the authentication code.

According to one embodiment, the data processing means are arranged for also inserting into the acknowledgement a portion of the authentication bits present in the signature.

According to one embodiment, the data processing means are arranged for producing the authentication code from the data received and at least one secret session key.

According to one embodiment, the data processing means are arranged for checking the authenticity of the signature received by using the authentication code.

One embodiment is a data transmission system for transmitting data between a point A and a point B, comprising data processing and communication means for producing at point A, from data to be transmitted, a first authentication code comprising authentication bits, transmitting, from point A to point B, the data and a signature comprising authentication bits of the authentication code, producing at point B, from the data received, a second authentication code presumed to be identical to the first one, producing an acknowledgement at point B, transmitting the acknowledgement from point B to point A, and checking at point A the authenticity of the acknowledgement received, wherein the data processing means are arranged for producing the first authentication code at point A so that the length of the first authentication code is greater than the length of the signature, the first authentication code comprising hidden authentication bits which are not inserted into the signature, producing the second authentication code so that the second authentication code also comprises hidden bits assumed to be identical to the hidden bits of the first authentication code, producing the acknowledgement by using hidden authentication bits of the second authentication code, and determining the authenticity of the acknowledgement at point A by checking that hidden authentication bits of the first authentication code are in the acknowledgement.

According to one embodiment, the data processing means are arranged for inserting into the acknowledgement all the hidden bits of the second authentication code, and determining the authenticity of the acknowledgement at point A by checking that all the hidden bits of the first authentication code are in the acknowledgement.

According to one embodiment, the data processing means are arranged for inserting all or part of the hidden bits of the second authentication code into the acknowledgement, in an order corresponding to their initial order in the second authentication code or in a reverse order compared to their initial order, and determining the authenticity of the acknowledgement at point A by checking that hidden bits of the first authentication code are in the acknowledgement in an order corresponding to their initial order in the first authentication code or in a reverse order compared to their initial order.

According to one embodiment, the data processing means are arranged for inserting all or part of the hidden bits of the second authentication code into the acknowledgement in an interlaced order determined by an interlacing function, compared to their initial order in the second authentication code, and determining the authenticity of the acknowledgement at point A by checking that all or part of the hidden bits of the first authentication code are in the acknowledgement in an interlaced order determined by said interlacing function, compared to their initial order in the first authentication code.

According to one embodiment, the data processing means are arranged for also inserting into the acknowledgement a portion of the authentication bits present in the signature, and determining the authenticity of the acknowledgement by also checking that the authentication bits of the signature are in the acknowledgement.

According to one embodiment, the data processing means are arranged for producing the signature from the data to be transmitted and at least one secret session key known at point A and known at point B.

According to one embodiment, the data processing means are arranged for checking the authenticity of the signature received at point B by using the second authentication code.

According to one embodiment, the data processing means are arranged for producing at point A an internal acknowledgement by using the hidden authentication bits of the first authentication code, and determining at point A the authenticity of the acknowledgement received by comparing it with the internal acknowledgement.

BRIEF DESCRIPTION OF THE SEVERAL VIEWS OF THE DRAWINGS

These and other features and advantages will be explained in greater detail in the following description of a method given in relation with, but not limited to, the following figures, in which.

DETAILED DESCRIPTION

Figure 3:
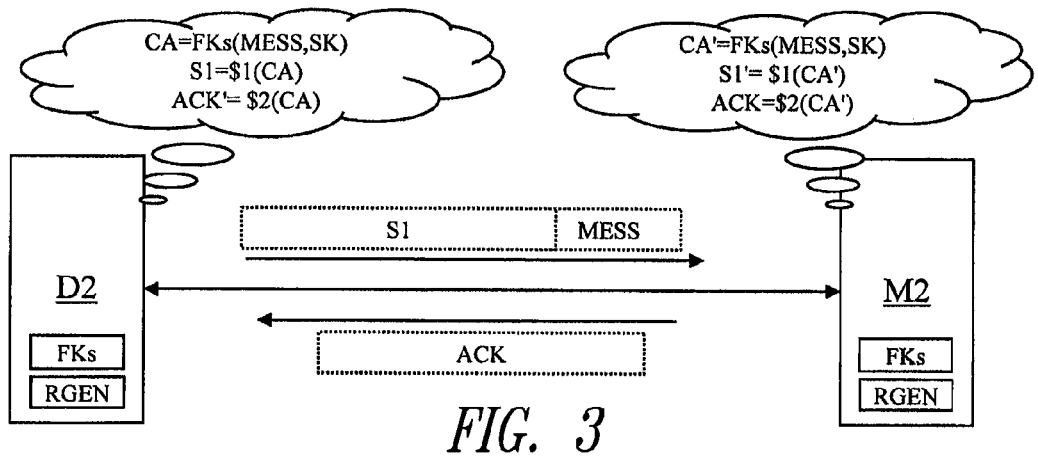

FIG. 3 represents a device D2 and a memory M2 according to one embodiment exchanging data through any wire or contactless data transmission line (radio link, RF inductive coupling link, UHF radio coupling link, etc.).

The device D2 and the memory M2 are components on a semiconductor chip each having a random generator RGEN and a cryptographic function FKs with a secret key Ks, and each hold the same secret key Ks. It is assumed here that the two components have authenticated one other, preferably mutually, in the manner described above, and have chosen a common session key SK. It is also assumed that the device D2 desires to send the memory M2 a message MESS together with a signature S1, and that the memory M2 will return an acknowledgement ACK.

Figure 1:
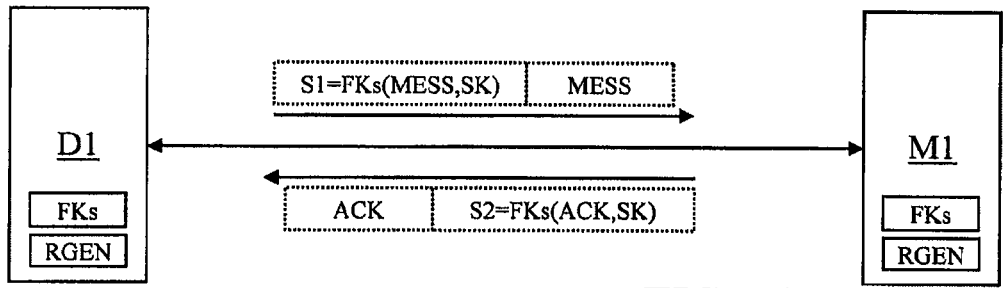
FIG. 1 described above schematically represents a device and a memory implementing a classic message signature and acknowledgement method, FIG. 2 described above is a flowchart describing steps of the classic message signature and acknowledgement method, FIG. 3 schematically represents a device and a memory implementing the message signature and acknowledgement method according to one embodiment.
Figure 2:
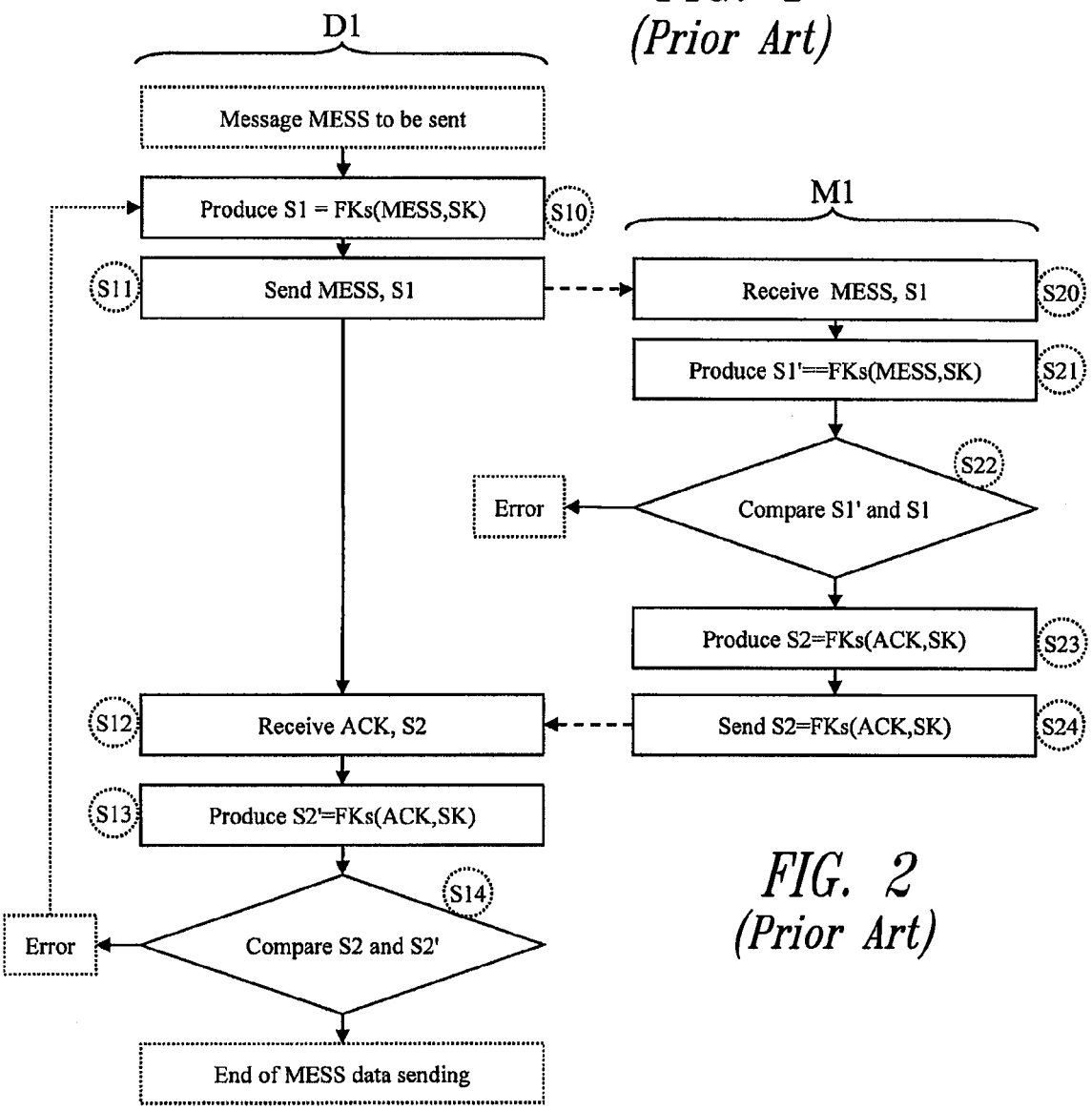
Figure 4:
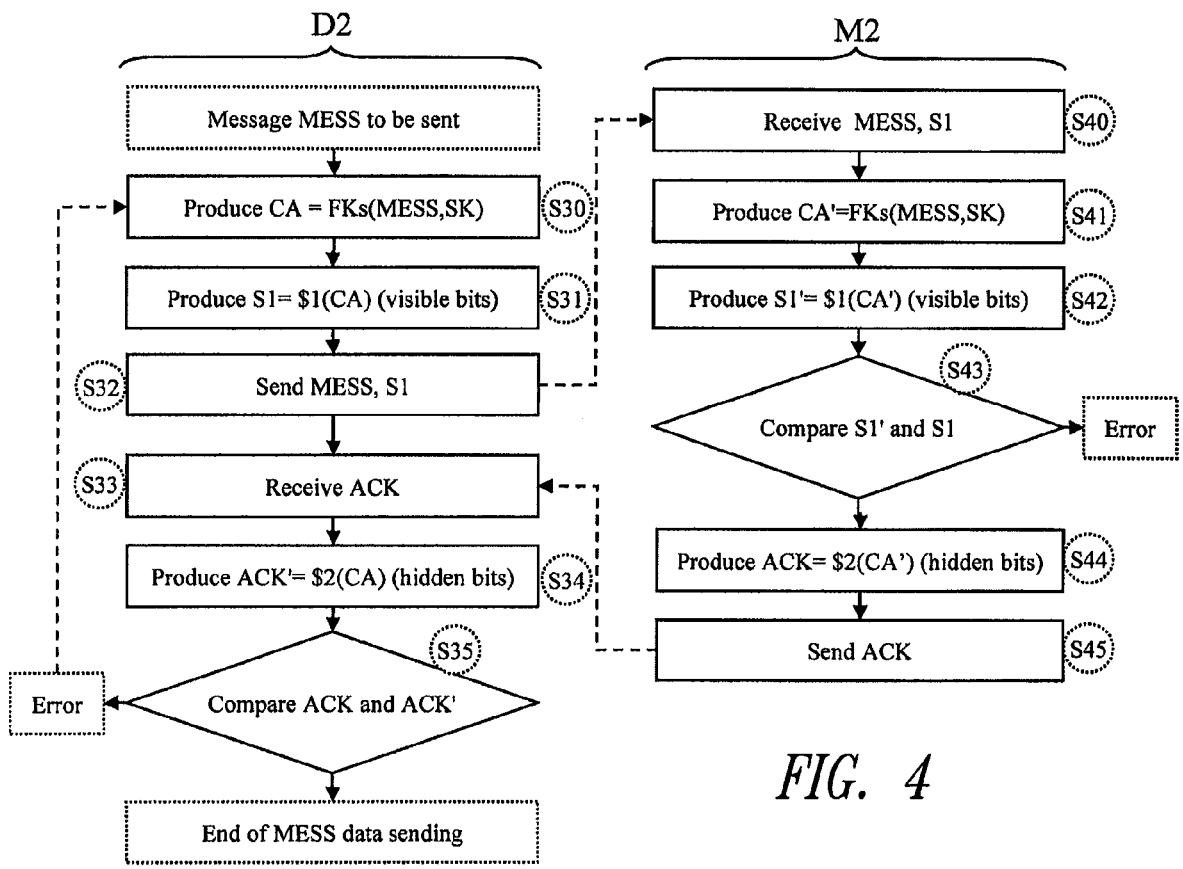
FIG. 4 is a flowchart describing steps of the method according to one embodiment.

The method according to one embodiment relates to the production of the acknowledgement ACK and provides that the latter is produced from an authentication code CA used to produce the signature S1, without the need to produce a second authentication code, as is the case in prior art (Refer to step S13, S23, FIG. 2). The main steps of the method are described by the flowchart in FIG. 4.

The device D2 first of all produces an authentication code CA (step S30) of a length (number of bits) greater than the length of the signature S1 that must be transmitted with the message MESS. The authentication code CA is produced in a manner that is classic per se, by using the message MESS and the session key SK as input data of the cryptographic function. The authentication code is thus of the type:

$CA=FKs(MESS,SK)$

The cryptographic function is for example an AES-CMAC algorithm based on the AES (Advanced Encryption System), with ciphering of the input data by blocks of 128 bits.

A truncation function $1 is then applied by the device D2 to the authentication code CA (step S31), to obtain the signature S1, which is thus of the type:

$S1=\$1(CA)$

This truncation function removes—or rather puts aside—a certain number of bits of the code CA, for example least significant bits, so that the length of the signature S1 corresponds to the length allocated to the signature field of the message. This length is defined by the format of the communication frames and depends on the communication protocol.

Once the signature S1 is produced, the device D2 sends the memory M2 the message MESS together with the signature S1 (step S31). The memory M2 receives the message and the signature (step S40) and then produces (step S41) an authentication code CA' by applying the same method as the device D2, i.e.:

$CA'=FKs(MESS,SK)$

As the memory M2 and the device D2 use the same cryptographic function and the same secret key, the code CA' is supposed to be identical to the code CA, in the absence of any hacking and if the message MESS has not been corrupted for other reasons between the moment at which it was sent and the moment at which it was received.

The memory M2 then produces an internal signature S1' supposed to be identical to the signature S1 received, by applying the truncation function $1 to the authentication code CA' (step S42), i.e.:

$S1'=\$1(CA')$

The memory then compares the signatures S1 and S1'. If the comparison is positive, the memory produces an acknowledgement ACK (step S44). The acknowledgement ACK is produced by using the hidden bits of the code CA', i.e., the bits unused by the truncation function $1, which have not been transmitted in plain text on the data transmission line linking the device D2 and the memory M2. For example, the acknowledgement is produced by applying to the code CA' a truncation function $2 which is the N's complement of the truncation function $1, N being the number of bits of the code CA'. In this case, the function $2 selects the bits set aside by the function $1 and rejects the bits used by the function $1. The acknowledgement is thus of the type:

$ACK=\$2(CA')$

Various alternative embodiments of this step of producing the acknowledgement ACK, based on the use of hidden bits, are possible. Thus, the function $2 may "cover" the function $1, i.e., select a set of bits comprising hidden bits and unhidden bits (i.e., bits already present in the signature S1) to produce the signature ACK. Conversely, the function $2 may not use all the hidden bits, and use only a portion of these (for example a determined number of subgroups of bits). The truncation function may also integrate an inverting function for inverting the bits compared to their initial order or integrate an interlacing function for interlacing the hidden bits to form a string of interlaced bits. If necessary, the interlacing can be done without incorporating the unhidden bits, or by incorporating all or part of the unhidden bits. Generally speaking, those skilled in the art will be able to provide various types of truncation functions with or without interlacing using hidden bits of the authentication code CA' to produce an acknowledgement.

The memory M2 then sends the acknowledgement ACK to the device D2 (step S45). The acknowledgement can be sent alone, as described in the flow chart in FIG. 4, or be preceded by the message MESS received, which is then also returned to the device D2 (echo technique). Those skilled in the art may also provide specific and differentiating acknowledgement codes (i.e., chosen according to the message received and/or carrying specific information) which each come with the acknowledgement ACK, which then forms a sort of signature attesting to the authenticity of the acknowledgement codes.

After receiving the acknowledgement ACK (step S33), the device M2 itself produces an internal acknowledgement ACK' (step S34). The internal acknowledgement is produced from the code CA that the device M2 had initially calculated, using the same truncation function $2 as the memory M2, i.e.:

ACK'=$2(CA)

The device D2 then compares (step S35) the acknowledgement received ACK and the internal acknowledgement ACK' to make sure that the message MESS has effectively been received and, according to the type of message, effectively been executed (write message for example).

Finally, this comparison step amounts to checking that the hidden bits are in the acknowledgement in an order corresponding to their initial order in the authentication code, or in an inverted order compared to their initial order, or even in an interlaced order determined by the interlacing function which is included in the truncation function $2. This comparison step also amounts to checking that unhidden bits of determined rank are also in the acknowledgement, if the truncation function $2 "covers" the truncation function $1 and reuses all or part of the bits already used by the function $1 to form the signature S1.

If the result of the comparison is negative, the device D2 repeats the steps S30 to S32 to produce a new authentication code CA, to produce a new signature S1 and to send the message MESS again.

Various alternatives of the method concerning the production of the signature S1 are also possible. For example, instead of producing the codes CA and CA' only from the message MESS and the session key SK, a variable CMPT, CMPT' can be added to the input data of the cryptographic function FKs. In this case the codes CA, CA' are of the type:

CA=FKs(MESS,CMPT,SK)
CA'=FKs(MESS,CMPT',SK)

The variable CMPT, CMPT' is for example a counting value evolving in a determined direction, ascending or descending. The variable CMPT is produced by means of a counter arranged in the device D2 and the variable CMPT', supposed to be identical to the variable CMPT, is produced by means of a counter arranged in the memory M2. The variable CMPT is incremented by one unit by the device D2 every time a message is sent and the variable CMPT' is incremented by one unit by the memory M2 every time a message is received.

The insertion of this variable into the input data used to produce the codes CA, CA' counters "replay"-type attacks, which consist in sending a command again together with a valid signature. Thus, for example, if the memory M2 sees that, in step S35, the acknowledgement received ACK is not valid and returns to step S30 to produce a new authentication code CA, the new authentication code CA is not equal to the previous one although the message MESS is the same since the variable CMPT has been incremented between step S35 and the return to step S30.

Furthermore, it will be noted that the internal acknowledgement ACK'can be produced by the device D2 at the time the signature S1 is produced, instead of being produced after receipt of the acknowledgement ACK. The internal acknowledgement ACK' is then stored until the acknowledgement ACK is received and the two acknowledgements can be compared immediately.

Figure 5:
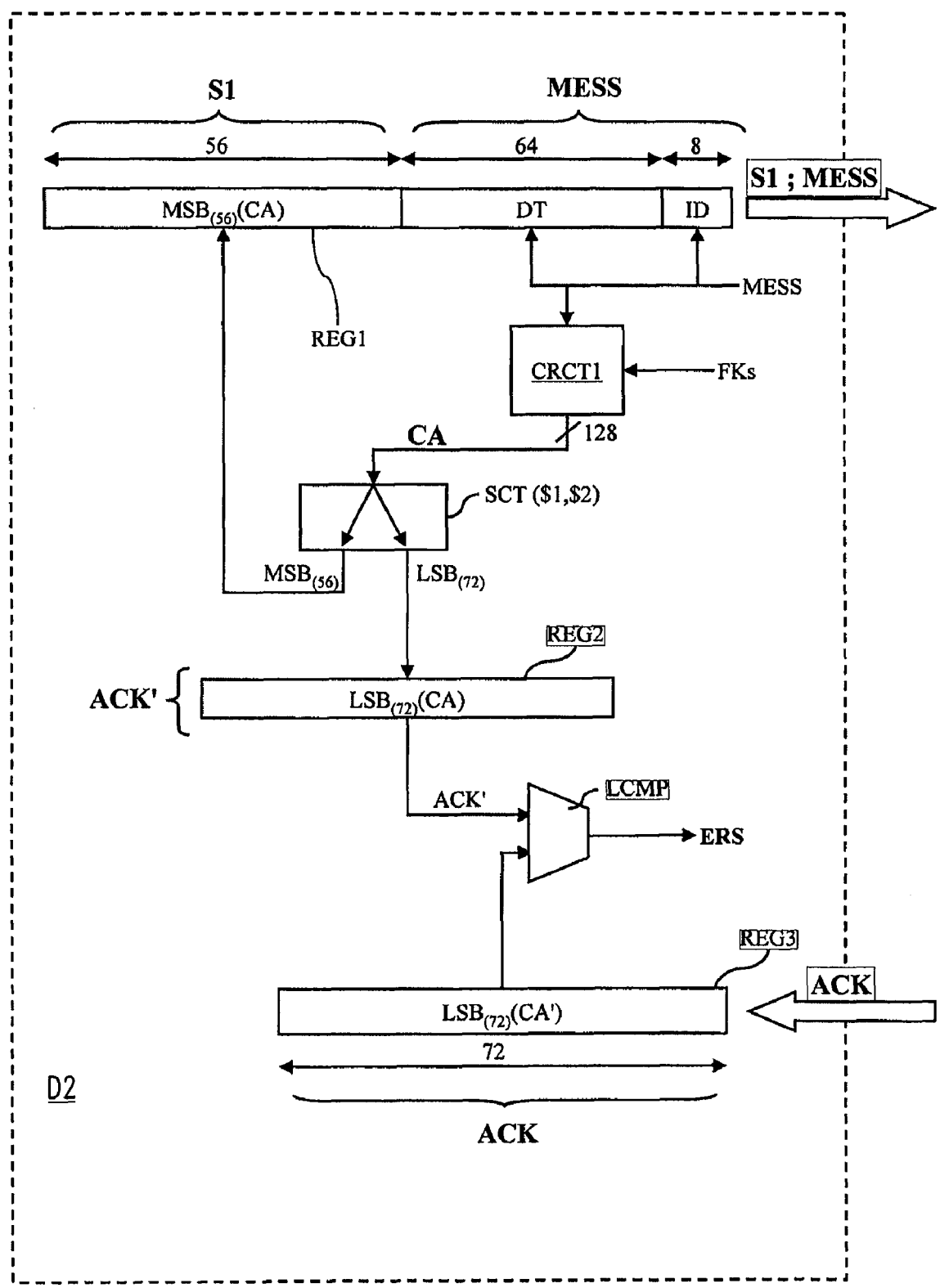
FIG. 5 represents an example of an embodiment of a hard-wired logic device implementing the method according to one embodiment.

FIG. 5 shows the implementation of the method in the device D2 by means of a hard-wired logic circuit. The device D2 comprises an encryption circuit CRCT1, a separator circuit SCT, a 128-bit output register REG1 with parallel input and serial output, a 72-bit intermediate register REG2 with parallel input/output, a 72-bit input register REG3 with serial input and parallel output, and a logic comparator LCMP having two parallel inputs each of 72 bits.

The register REG1 comprises a 72-bit zone for receiving a message MESS to be sent and a 56-bit zone for receiving the signature S1 which comes with the message. The message here comprises a 8-bit identifier ID and a 64-bit data field DT. The identifier ID is for example a command intended for the memory M2 (read, write, global erase command, etc.) and the data DT contain for example a write or read address for writing or reading the memory M2 and possibly data to be written.

The circuit CRCT1 is for example an AES-CMAC circuit, as indicated above, with ciphering of the input data by blocks of 128 bits using the secret key Ks. Its 128-bit output supplies the input of the separator circuit SCT with the authentication code CA. The separator circuit SCT simultaneously performs the truncation functions $1 and $2 by separating the 56 MSB bits (most significant bits) from the code CA to form the signature S1, and the 72 LSB bits (least significant bits) of the code CA to form the internal acknowledgement ACK'. The circuit SCT thus comprises here a 56-bit output and a 72-bit output. The 56-bit output is linked to an input of the register REG1 corresponding to the 56-bit zone dedicated to the signature S1. The 72-bit output is linked to the input of the intermediate register REG2, used to store the internal acknowledgement ACK'. The output of the register REG2 is linked to an input of the comparator LCMP and the other input of the comparator is linked to the parallel output of the register REG3.

The message MESS is first of all loaded into the 72-bit zone of the register REG1 and is applied simultaneously to the input of the circuit CRCT1. The latter is then activated and supplies the separator circuit SCT with the code CA which then supplies the signature S1 and the internal acknowledgement ACK'. The signature S1 is loaded into the 56-bit zone of the register REG1 and the internal acknowledgement is loaded into the intermediate register REG2. The register REG1 is then controlled to send, bit by bit, the message MESS and the signature S1 to the memory M2 (not represented).

The acknowledgement ACK returned by the memory M2 is received bit by bit by the register REG3, through its serial input. When the register REG3 is full, the content of the register is applied to the second input of the comparator LCMP. The output of the comparator supplies an error signal ERS which changes for example to 1 if the acknowledgements ACK, ACK' are not identical.

In accordance with the alternatives described above concerning the production of the acknowledgement ACK, the separator circuit may include an interlacing function of the LSB bits supplied to the register REG2. Moreover, MSB bits (unhidden bits) can be injected and mixed with the LSB bits supplied to the register REG2. An interlacing of all or part of the MSB bits and of all or part of the LSB bits can also be provided to produce the signature S1.

It will be understood by those skilled in the art that a similar hard-wired logic circuit can be provided in the memory M2 to execute the corresponding steps of the method of the present invention. Furthermore, such a hard-wired logic circuit structure may comprise an output register with parallel output and an input register with parallel input, if the data link between the memory and the device is of parallel type.

Figure 6:
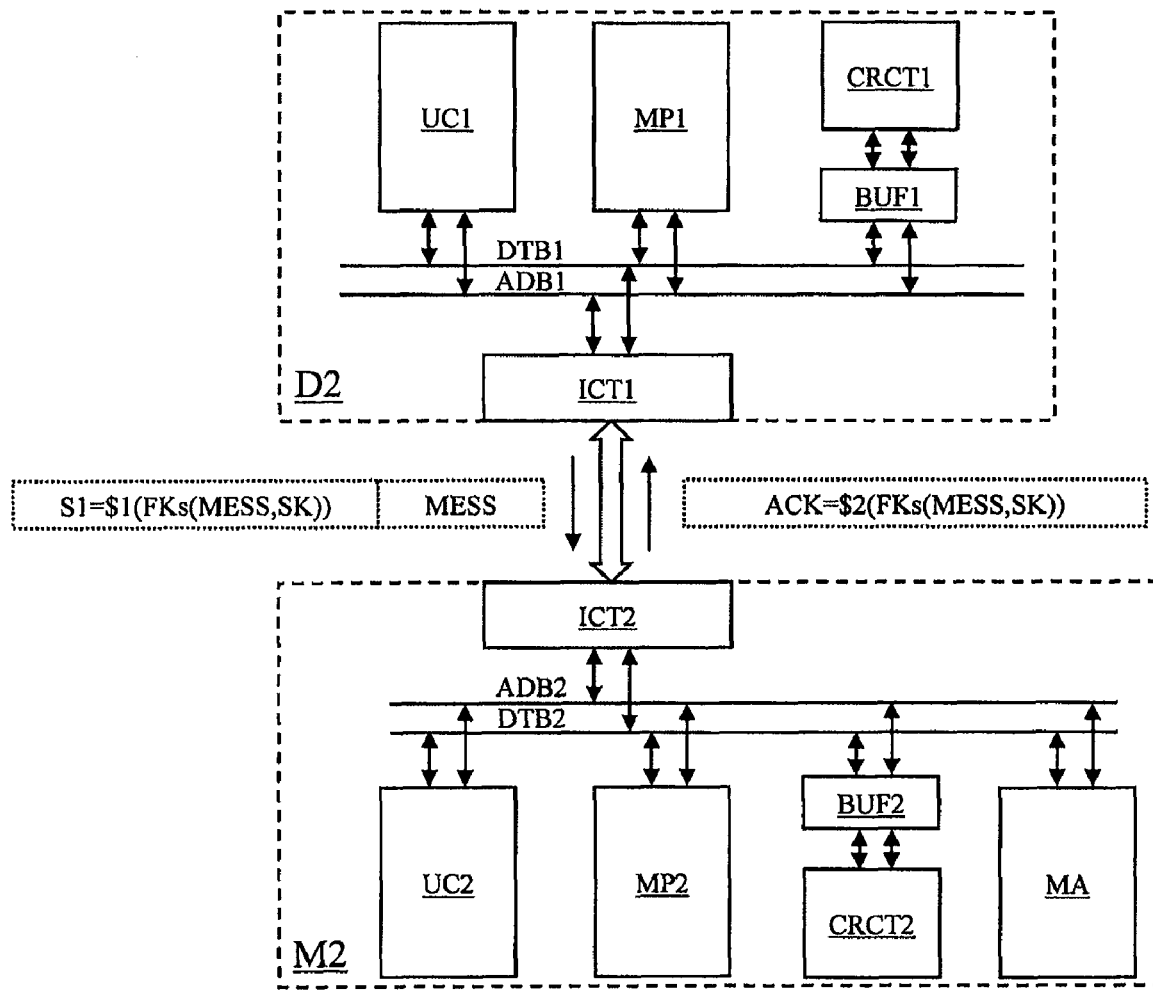
FIG. 6 represents in block form another example of an embodiment of a device and an example of an embodiment of a memory.

FIG. 6 represents another example of architecture of the device D2 and of the memory M2. The architecture represented here is an architecture with data bus and address bus offering various possible implementations of the method.

The device D2 comprises a central processing unit UC1, a program memory MP1, the circuit CRCT1 already described and a wire or wireless communication interface circuit ICT1. These elements are linked to a data bus DTB1 and an address bus ADB1. The circuit CRCT1 is linked to the buses DTB1, ADB1 through a buffer circuit BUF1 enabling the 128-bit authentication block supplied by the circuit CRCT1 to be converted into several data blocks of a length compatible with the size of the data bus (for example 16 or 32 bits).

The memory M2 comprises a microprocessor or hard-wired logic (preprogrammed sequencer for executing commands) central processing unit UC2, a program memory MP2, an encryption circuit CRCT2 similar to the circuit CRCT1, a wire or wireless communication interface circuit ICT2, and a memory array MA of electrically erasable and programmable type (for example EEPROM or FLASH). These elements are linked to a data bus DTB2 and an address bus ADB2. The circuit CRCT2 is linked to the buses DTB2, ADB2 through a buffer circuit BUF2 enabling the 128-bit authentication block supplied by the circuit CRCT2 to be converted into data blocks of a length compatible with the size of the data bus.

The device D2 and the memory M2 communicate through the interface circuits ICT1, ICT2, to exchange messages MESS (particularly write or read commands for writing or reading the memory array MA) and corresponding acknowledgements ACK. The central processing units UC1, UC2 generate random numbers for the mutual authentication and execute the truncation functions $1, $2, from the authentication codes CA, CA' supplied by the circuits CRCT1, CRCT2. However, these capabilities could also be entrusted to dedicated circuits (not represented), i.e., a random generator and a truncation circuit linked to the data and address buses and accessible like common peripherals.

It will be understood by those skilled in the art that the present invention is in no way limited to the application that has just been described and generally speaking relates to the securization of communications between devices equipped with communication means, the messages MESS not necessarily being commands intended for a memory. For example, the device M2 referred to as "memory" above becomes a device for sending/receiving "lambda" data if its memory array MA is removed or if it is only provided for the internal needs of the device. Thus, the description above generally relates to the securization of a data transmission between two devices. The present invention may for example be implemented to secure a data transmission between a smart card and a smart card reader.

It will also be understood by those skilled in the art that the implementation means of the present invention are not limited to the examples described. For example, it may be decided not to use any random generator to perform the steps of mutual authentication. A table containing random numbers may for example be stored in the secured device and a random number can be chosen in the table while avoiding the same random number being used during sessions too close together. Similarly, pseudo random generators or even simple counters can be used, according to the degree of safety sought, to generate numbers considered, conceptually speaking, to be "random".

Various known alternative embodiments of the method according to the present invention are possible concerning the steps it comprises that are classic per se. For example, the steps of mutual authentication can be replaced with a step of one-way authentication of one device by another. The step of one-way authentication could even be removed without necessarily reducing the advantages the method of the present invention offers concerning the reduction of the number of cryptographic calculation steps.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
producing with a first electronic device, from data to be sent to a second electronic device, an authentication code including authentication bits;
generating, from the authentication code, a signature including a subset of the authentication bits of the authentication code, the authentication code having a length that is greater than a length of the signature, and the authentication code including hidden bits which are not inserted into the signature;
sending to the second electronic device the data and the signature, and not sending each bit of the authentication code, so that hidden bits of authentication code which are not inserted into the signature are not sent;
receiving an acknowledgement from the second electronic device; and
producing an internal acknowledgement by using the hidden bits of the authentication code; and
determining the authenticity of the received acknowledgement by comparing the received acknowledgement with the internal acknowledgement by checking that at least some of the hidden bits of the authentication code are in the received acknowledgement.

2. A method according to claim 1, wherein the authenticity of the acknowledgement is determined by checking that all the hidden bits of the authentication code are included in the acknowledgement.

3. A method according to claim 1, wherein the authenticity of the acknowledgement is determined by checking that at least some of the hidden bits of the authentication code are included in the acknowledgement in an order corresponding to an initial order of the hidden bits in the authentication code or in a reverse order compared to the initial order.

4. A method according to claim 1, wherein the authenticity of the acknowledgement is determined by checking that all or part of the hidden bits are in the acknowledgement in an interlaced order determined by an interlacing function, compared to an initial order of the hidden bits in the authentication code.

5. A method according to claim 1, wherein the authenticity of the acknowledgement is determined by also checking that authentication bits present in the signature are in the acknowledgement.

6. A method according to claim 1, wherein the authentication code is produced from the data to be sent and at least one secret session key.

7. A method for receiving data, comprising:
receiving, with a memory device, data and a signature, the signature including a first set of authentication bits;
producing, by the memory device, from the data received, an authentication code including the first set of authentication bits and hidden authentication bits which are not present in the received signature, the authentication code having a length that is greater than a length of the signature; and
producing and sending, by the memory device, an acknowledgement by using the hidden authentication bits of the authentication code, the authenticity of the acknowledgement verifiable by a sending device with a comparison to a secret acknowledgement internally generated by the sending device, the secret acknowledgement having at least some of the hidden authentication bits.

8. A method according to claim 7, wherein all the hidden bits of the authentication code are inserted into the acknowledgement.

9. A method according to claim 7, wherein all or part of the hidden bits of the authentication code are inserted into the acknowledgement, in an order corresponding to an initial order in the authentication code or in a reverse order compared to the initial order.

10. A method according to claim 7, wherein all or part of the hidden bits are inserted into the acknowledgement in an interlaced order determined by an interlacing function, compared to an initial order in the authentication code.

11. A method according to claim 7, wherein a portion of the first set of authentication bits present in the signature is also inserted into the acknowledgement.

12. A method according to claim 7, wherein the authentication code is produced from the data received and at least one secret session key.

13. A method according to claim 7, comprising a step of checking the authenticity of the signature received by using the authentication code.

14. A method for transmitting data between a point A and a point B, comprising:
producing with a first data processor circuit at point A, from data to be transmitted, a first authentication code having authentication bits;
generating a signature from a subset of the authentication bits of the first authentication code, the length of the first authentication code being greater than the length of the signature, the first authentication code having hidden authentication bits which are not used to generate the signature;
transmitting, from point A to point B, the data and the signature;
producing at point A an internal acknowledgement by using the hidden bits of the first authentication code;
producing with a second data processor circuit at point B, from the data received, a second authentication code that includes hidden bits;
producing with the second data processor circuit at point B an acknowledgement using at least some of the hidden bits of the second authentication code;
transmitting the acknowledgement from point B to point A; and
determining at point A the authenticity of the received acknowledgement by comparing the received acknowledgement with the internal acknowledgement by checking that at least some of the hidden bits of the first authentication code are in the received acknowledgement.

15. A method according to claim 14, wherein:
all the hidden bits of the second authentication code are inserted into the acknowledgement; and
the authenticity of the acknowledgement is determined at point A by checking that all the hidden bits of the first authentication code are in the acknowledgement.

16. A method according to claim 14, wherein:
all or part of the hidden bits of the second authentication code are inserted into the acknowledgement, in an order corresponding to an initial order in the second authentication code or in a reverse order compared to the initial order; and
the authenticity of the acknowledgement is determined at point A by checking that hidden bits of the first authentication code are in the acknowledgement in an order corresponding to an initial order in the first authentication code or in a reverse order compared to the initial order in the first authentication code.

17. A method according to claim 14, wherein:
all or part of the hidden bits of the second authentication code are inserted into the acknowledgement in an interlaced order determined by an interlacing function, compared to their initial order in the second authentication code, and
the authenticity of the acknowledgement is determined at point A by checking that all or part of the hidden bits of the first authentication code are in the acknowledgement in an interlaced order determined by said interlacing function, compared to their initial order in the first authentication code.

18. A method according to claim 14, wherein:
a portion of the authentication bits present in the signature is also inserted into the acknowledgement, and
the authenticity of the acknowledgement is determined by also checking that the authentication bits of the signature are in the acknowledgement.

19. A method according to claim 14, wherein the first authentication code is produced from the data to be transmitted and at least one secret session key known at point A and known at point B.

20. A method according to claim 14, comprising a step of checking the authenticity of the signature received at point B by using the second authentication code.

21. A device comprising:
data processing means for producing, from data to be sent, an authentication code that includes authentication bits, and a signature, the signature including a subset of the authentication bits of the authentication code, the authentication code having a length that is greater than a length of the signature, the authentication code including hidden bits which are not inserted into the signature and the data processing means for producing an internal acknowledgement by using the hidden bits of the authentication code;
storing means for holding the internal acknowledgement; and
communication means for sending the data and the signature and for receiving an acknowledgement, wherein the data processing means are also for determining the authenticity of the acknowledgement by comparing the received acknowledgement with the internal acknowledgement by checking that at least some of the hidden bits of the authentication code are in the received acknowledgement.

22. A device according to claim 21 wherein the data processing means includes:
a first storage element structured to store the data and the signature;
a second storage element structured to store the hidden bits of the authentication code;
an encryption circuit structured to produce the authentication code from the data to be sent;
a separator circuit structured to separate the signature from the hidden bits of the authentication code, cause the signature to be stored in the first storage element; and cause the hidden bits of the authentication code to be stored in the second storage element;
a third storage element structured to store the acknowledgement received; and
a comparator structured to compare the acknowledgement received with the hidden bits of the authentication code.

23. A device according to claim 21 wherein the data communication means includes a communication interface circuit and the data processing means includes:
a program memory;
a central processing unit structured to determine the authenticity of the acknowledgement by checking that the acknowledgement authentication bits are in the acknowledgement;
an encryption circuit structured to produce the authentication code from the data to be sent;
a buffer coupled to the encryption circuit and structured to buffer the authentication code; and
a bus structured to link the program memory, central processing unit, buffer, and communication interface circuit to one another.

24. A device comprising:
communication means for receiving data and a signature and for sending an acknowledgement, the received signature including a first set of authentication bits; and
data processing means for producing, from the received data, an authentication code, the authentication code including the first set of authentication bits and hidden authentication bits which are not present in the received signature, the authentication code having a length greater than a length of the signature, and the data processing means for producing the acknowledgement, the acknowledgement being produced using the hidden authentication bits of the authentication code, the authenticity of the acknowledgement verifiable by a sending device with a comparison to a secret acknowledgement internally generated by the sending device, the secret acknowledgement having at least some of the hidden authentication bits.

25. A device according to claim 24 wherein the data processing means includes:
a first storage element structured to store the data and the signature;
an encryption circuit structured to produce the authentication code from the data received, the authentication code including an internal signature and the hidden authentication bits;
a second storage element structured to store the internal signature;
a third storage element structured to store the hidden authentication bits of the authentication code;
a separator circuit structured to separate the internal signature from the hidden authentication bits of the authentication code, cause the signature to be stored in the second storage element; and cause the hidden authentication bits to be stored in the third storage element; and
a comparator structured to compare the signature received with the internal signature.

26. A device according to claim 24 wherein the data communication means includes a communication interface circuit and the data processing means includes:
a program memory;
a memory array structured to store the data;
a central processing unit structured to produce the acknowledgement using the hidden authentication bits of the authentication code;
an encryption circuit structured to produce the authentication code from the data received;
a buffer coupled to the encryption circuit and structured to buffer the authentication code; and
a bus structured to link the program memory, memory array, central processing unit, buffer, and communication interface circuit to one another.

27. A data transmission system, comprising:
a first device including:
data processing means for producing, from data to be transmitted, a first authentication code that includes first authentication bits, and a signature the signature including a subset of the first authentication bits of the first authentication code, the first authentication code having a length that is greater than a length of the signature, the first authentication code including hidden bits which are not inserted into the signature;
communication means for transmitting the data and the signature and for receiving an acknowledgement that includes acknowledgement authentication bits; and
storing means for holding the hidden bits of the first authentication code, the stored hidden bits not being transmitted by the communication means; and
a second device including:
communication means for receiving the data and the signature and for transmitting the acknowledgement; and
data processing means for producing, from the received data a second authentication code that includes second authentication bits, and for producing the acknowledgement, the second authentication code having a length greater than a length of the signature, the second authentication code including hidden bits which are not present in the received signature, the acknowledgement being produced using the hidden bits of the second authentication code, wherein the data processing means of the first device are also for checking the authenticity of the received acknowledgement by checking that the hidden bits of the received acknowledgement correspond to the stored hidden bits of the first authentication code.

28. A device comprising:

an encryption circuit structured to produce, from data to be sent, an authentication code that includes authentication bits, and a signature that includes a subset of the authentication bits of the authentication code, the authentication code having a length that is greater than a length of the signature, the authentication code including hidden bits which are not inserted into the signature, the encryption circuit structured to produce an internal acknowledgement using the hidden bits of the authentication code;

a transceiver circuit structured to send the data and the signature and receive an acknowledgement that includes acknowledgement authentication bits; and a data processor circuit structured to determine the authenticity of the acknowledgement by comparing the acknowledgement received with the internal acknowledgement by checking that the acknowledgement authentication bits correspond to the held hidden bits.

29. The device of claim 28 wherein the data processor circuit includes a central processing unit structured to ensure that the hidden bits are not inserted into the signature and structured to determine the authenticity of the acknowledgement by checking that the acknowledgement authentication bits are in the acknowledgement.

30. The device of claim 28 wherein the data processor circuit includes:

a separator circuit structured to separate the signature from the hidden bits of the authentication code; and a comparator structured to compare the acknowledgement received with the hidden bits of the authentication code.

31. A device comprising:

a transceiver circuit structured to receive data and a signature, the signature including a set of authentication bits, and transmit an acknowledgement that includes acknowledgement authentication bits;

an encryption circuit structured to produce, from the received data, an authentication code that includes the set of authentication bits and hidden authentication bits which are not present in the received signature, the authentication code having a length greater than a length of the signature; and a data processor circuit structured to produce the acknowledgement using the hidden authentication bits of the authentication code, the authenticity of the acknowledgement verifiable by a sending device with a comparison to a secret acknowledgement internally generated by the sending device, the secret acknowledgement having at least some of the hidden authentication bits.

32. The device of claim 31 wherein the data processor circuit includes a central processing unit structured to produce the acknowledgement using the hidden authentication bits of the authentication code.

33. The device of claim 31 wherein the authentication code produced by the encryption circuit includes an internal signature and the hidden authentication bits and the data processor circuit includes:

a separator circuit structured to separate the signature from the hidden authentication bits of the authentication code; and a comparator structured to compare the signature received with the internal signature.

* * * * *